No. 839,905. PATENTED JAN. 1, 1907.
H. M. THAYER.
METALLIC FEED BOX.
APPLICATION FILED JUNE 27, 1906.
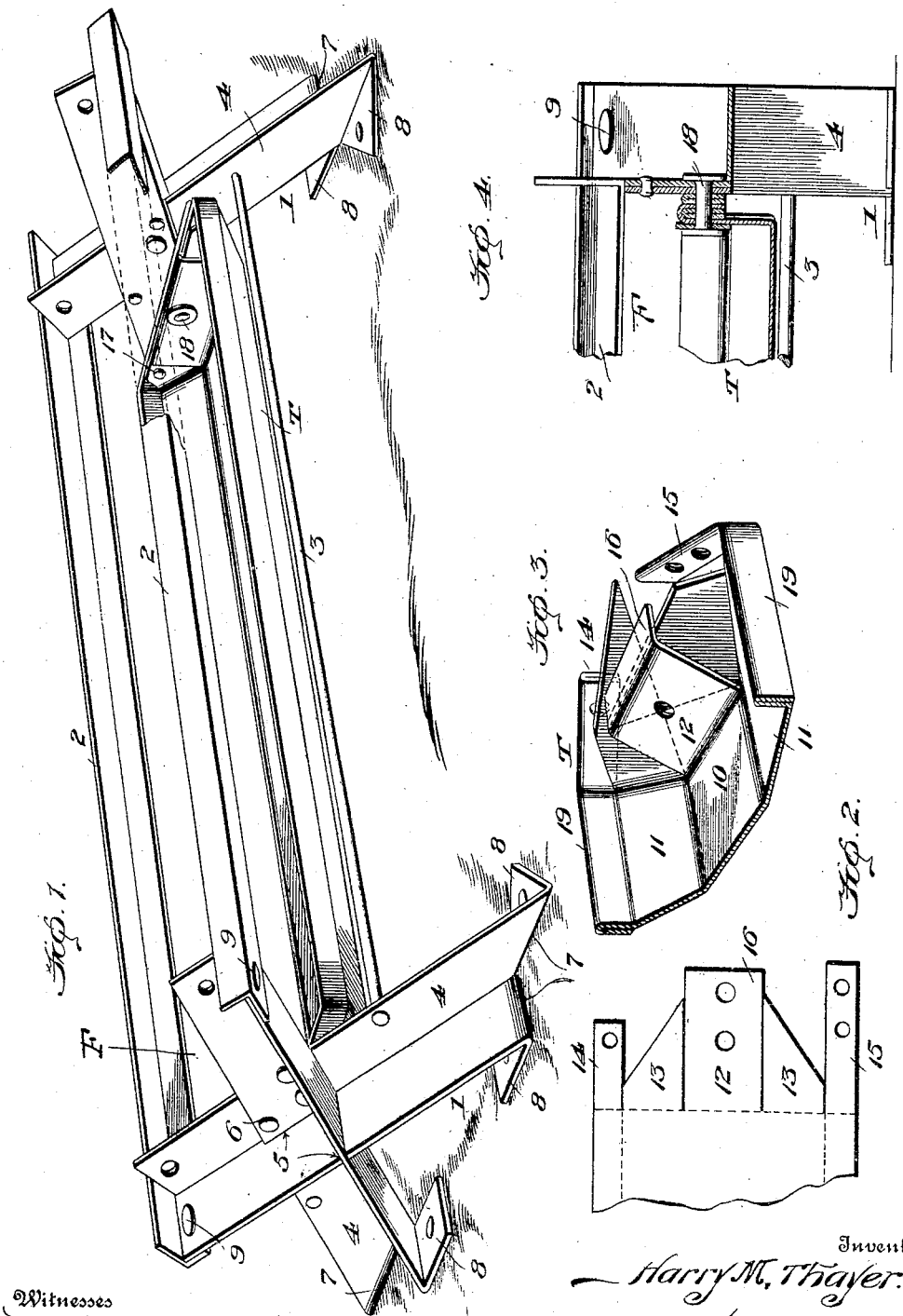
Witnesses
Inventor
Harry M. Thayer.
Attorney

UNITED STATES PATENT OFFICE.

HARRY M. THAYER, OF WOODHULL, ILLINOIS.

METALLIC FEED-BOX.

No. 839,905.  Specification of Letters Patent.  Patented Jan. 1, 1907.

Application filed June 27, 1906. Serial No. 323,576.

*To all whom it may concern:*

Be it known that I, HARRY M. THAYER, a citizen of the United States, residing at Woodhull, in the county of Henry and State of Illinois, have invented certain new and useful Improvements in Metallic Feed-Boxes, of which the following is a specification.

This invention relates to an improved metallic feed-box for stock-feeding purposes and possessing special utility for the feeding of sheep.

To this end the invention contemplates an all-metal feed-box so constructed as to possess great durability and at the same time possessing special advantages for the feeding of short-necked animals, such as sheep.

The invention also has in view a new and practical type of tilting or turning trough so constructed as to possess superior advantages for the feeding of mill-feeds—such as wheat-screenings, bran, oats, corn, oil-meal, alfalfa-meal—or any other sheep feed. Also the improved tilting trough is so mounted as to readily adapt itself to the short neck of the sheep and automatically work the feed down from the far side to the side where the sheep are feeding, so that the feed can be easily reached by the animals.

Furthermore, the invention provides means for constructing a practically non-destructible water-feeding trough having thoroughly reinforced ends and corners and provided with water-tight joints, thereby rendering the trough available as a feeding or watering trough.

Another object of the invention is to so construct the holding-frame as to afford an easy rest for the animal while feeding and also provide a guard against the sheep climbing into the box.

The essential features of the invention are susceptible to structural change without departing from the scope thereof; but a preferred embodiment of the invention is shown in the accompanying drawings, in which—

Figure 1 is a perspective view of a metallic stock-feeding box constructed in accordance with the present invention. Fig. 2 is a plan view of the end portion of the blank bent and pressed up into the shape shown in Fig. 3. Fig. 3 is an enlarged detail sectional perspective of one end portion of the tilting trough, showing the laminated reinforced end formation for the trough. Fig. 4 is a sectional view of one end portion of the box, showing the pivotal mounting of the end portion of the trough upon one of the end leg-stands.

Like references designate corresponding parts in the several figures of the drawings.

In carrying out the present invention the same embodies in its general organization a horizontal open rectangular holding-frame (designated in its entirety by the reference character F) and a tiltable seamless metallic trough, (designated as a unit by the reference character T and pivotally hung at its ends within said frame in the manner hereinafter more particularly pointed out.)

The holding-frame, as well as the other parts of the feed-box structure, is made of metal, preferably of galvanized iron or steel, and said holding-frame is also constructed in a substantial well-braced manner, which enables the same to withstand shocks and strains without danger of breakage or impairing the free pivotal hanging of the trough T therein.

The holding-frame F essentially comprises the oppositely-arranged X-shaped end leg-stands 1, a pair of upper longitudinal guard-rails 2, and a pair of longitudinal rest-bars 3, all of which parts are rigidly and permanently connected to provide a rigid supporting and holding framework for the pivotal trough T. Each of the X-shaped end leg-stands 1 consists of a pair of interlocked crossing leg members 4, preferably constructed of angle-bars, whose flanges provide a strong reinforced construction and at the same time afford a wide base for the feed-box structure.

In the present invention the angle-bars constituting the individual leg members 4 are arranged to intersect each other at a point intermediate their ends, as plainly shown in Fig. 1 of the drawings, and to effect a strongly-interlocked connection between these individual leg members of each leg-stand one of said members has formed in one of the flanges thereof an L-shaped keeper-slot 5, within which snugly registers the cross-sectionally L-shaped other leg member 4. The two leg members of each stand thus interlocked in their crossing relation are permanently fastened together through the medium of the securing-rivets 6. In addition to the manner of interlocking the leg members or standards together each of said leg members or standards is slotted at its lower end, as at 7, and the slotted portions bent in opposite directions to provide off-standing rest-feet 8, which may be secured to the floor or rest upon the ground to provide a supporting-base for the holding-frame.

The longitudinal guard-rails 2, previously referred to, are a part of the holding-frame structure and preferably consist of angle-bars arranged, respectively, upon opposite sides of the longitudinal center of the holding-frame and securely riveted to the individual leg members 4 of the leg-stands, as at 9, thus providing an arrangement which prevents the sheep from climbing into the pivotal or tilting feeding-trough T. Also the holding-frame structure includes as a part thereof the lower longitudinal rest-bars 3, which are arranged substantially parallel with the upper guard-rails 2 and in a lower plane slightly below the horizontal plane of the pivotal supports for the trough T. The said rest-bars 3 are upset or otherwise rigidly secured at their ends to the individual leg members of the opposite leg-stands, and thereby, in effect, constitute tie-rods for bracing the lower portions of the leg-stands. At the same time the said rest-bars constitute rests against which the sheep lean while feeding, and said bars therefore also serve as guards for the tilting trough T. The said tilting or pivotal trough T constitutes one of the distinctive features of the present invention, inasmuch as the same is constructed in such manner as to have thoroughly-reinforced ends and water-tight corner-joints.

Referring particularly to the peculiar formation of the trough T, the same is preferably constructed from a single seamless blank of sheet metal struck up to provide a bottom portion 10 and the opposite inclined side walls 11. The blank from which the trough is made is slitted with a plurality of slits, as plainly shown in the plan of Fig. 3, to produce a central end wall-flap 12, foldable corner-flaps 13, arranged at the sides of the central flaps 12, and the rim extension-strips 14 and 15, which are respectively of different lengths.

In the process of setting up the parts referred to the end wall-flap 12 is bent up from the bottom 10 at substantially right angles thereto and is folded upon itself at the top edge to form a folded locking-flange 16, which is bent over the top edges of the corner-flaps 13, which are folded in overlapping relation over and against the outer side of the central end wall-flap 12, as may be plainly seen from Figs. 2 and 4 of the drawings. With the flaps 12 and 13 and the flange 16 in the relation referred to the long and short rim extension-strips 14 and 15 are folded in overlapping relation upon the outer side of the flaps 13 and the flange 16 and are permanently held through the medium of securing-rivets 17, passing through the strips 14 and through the folded corner-flaps 13.

At each end of the trough T the overlapping parts of the flap 12, flaps 13, flange 16, and the rim extensions 14 and 15 are pierced by a rivet 18, constituting a trunnion, which is also secured in the adjacent end leg-stand 1. Hence the trunnions 18 at the opposite ends of the trough constitute auxiliary fastening means for the end portions of the trough, while at the same time provide for the pivotal support thereof.

At the upper edges of the trough-body the metal is folded upon itself to provide a folded reinforced rim 19, extending along the sides of the trough-body and continued into the rim extension-strips 14 and 15.

From the foregoing it is thought that the construction, operation, and many advantages of the herein-described metallic stock-feeding box will be understood without further description; but it will also be understood that changes in the form, proportion, and minor details of construction may be resorted to without sacrificing the spirit of the invention.

I claim—

1. In a metallic feed-box, a holding-frame comprising oppositely-arranged X-shaped end leg-stands, consisting of angle-bar leg members arranged in crossing relation the one provided with an L-shaped slot to receive the other, said leg members being rigidly secured together and provided with rest-feet at their lower ends, angle-bar guard-rails connecting the upper ends of the leg members of the opposite stands, and longitudinal rest-bars also connecting the leg members in a plane below the guard-rails, and a tilting metallic trough pivotally hung within the holding-frame in a plane between said rest-bars.

2. In a metallic feed-box, a metallic holding-frame, a tilting feeding-trough consisting of a single blank of sheet metal struck up to form a trough-body, and provided at its end with an upstanding end wall-flap having an outturned locking-flange at its upper edge, corner-flaps bent from the sides of the trough-body, arranged in overlapping relation at one side of the end wall-flap and beneath the locking-flange thereof, and rim extension-strips extended from the rim portions of the trough-body and arranged in overlapping relation to the corner-flaps, and pivot-trunnions fitted to said frame and extending through the several overlapping elements at the ends of the trough-body.

In testimony whereof I hereunto affix my signature in the presence of two witnesses.

HARRY M. THAYER.

Witnesses:
W. E. SHETLER,
ARTHUR GILLETS.